United States Patent Office 3,625,702
Patented Dec. 7, 1971

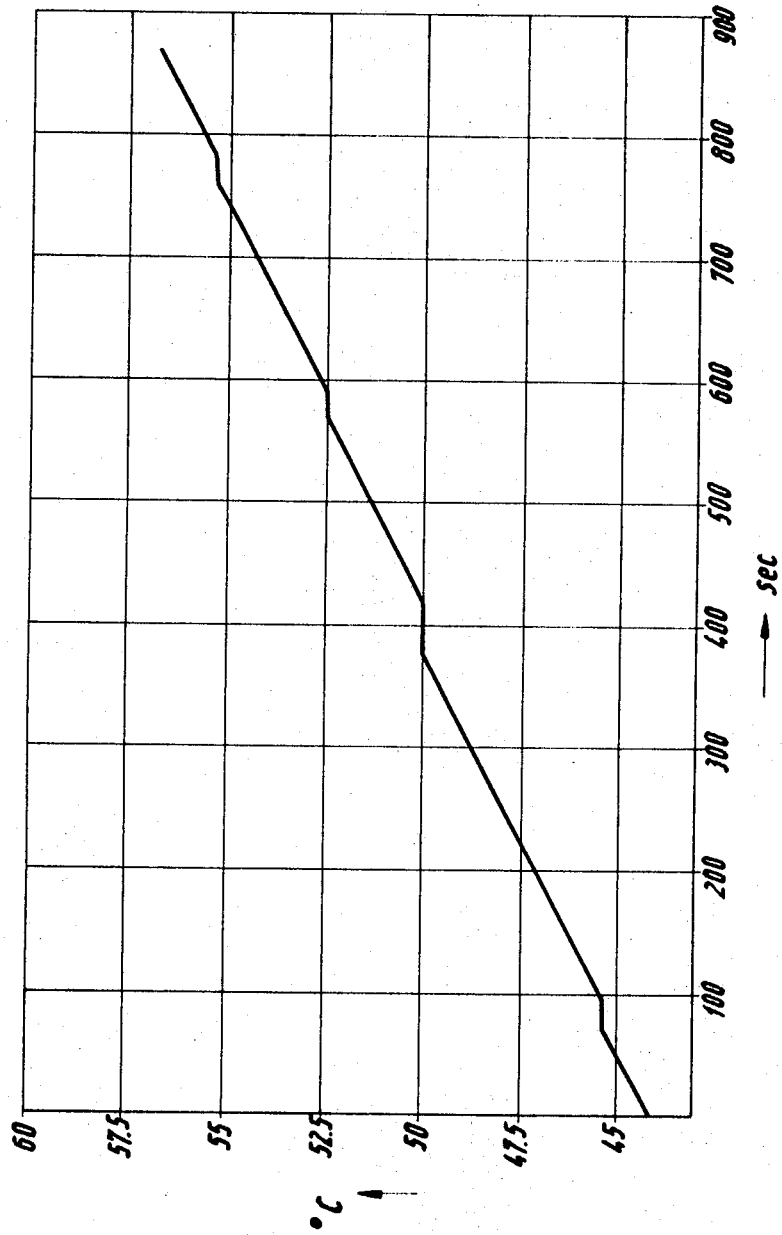

---

3,625,702
PREPARATION OF SOUR MILK DRINKS
Heinrich Exler, Ravensberger Strasse 86,
Borgholzhausen 4801, Germany
Filed July 18, 1969, Ser. No. 842,973
Claims priority, application Germany, July 20, 1968,
P 17 92 084.2
Int. Cl. A23c 9/12
U.S. Cl. 99—59          6 Claims

ABSTRACT OF THE DISCLOSURE

A sour milk drink is formed by souring skimmed fresh milk, adding an aqueous solution of citric acid and concentrated flavouring, followed by a mixture of pectin and sugar, homogenising the product in a first homogeniser at a temperature of approximately 15° C. and a pressure of 150 to 160 atmospheres gauge, heating the homogenised product to a temperature of from 51 to 54.5° C. and raising its pressure to 350 to 380 atmospheres gauge, homogenising the product in a second homogeniser at the latter temperature and pressure, pouring the product into bottles and pasteurising it for 20 to 30 minutes at an elevated temperature.

---

This invention relates to the manufacture of sour milk drinks.

Sour or acidified milk, sugared and flavoured with fruit juices or the like, is produced on a large scale. Known drinks or food of this kind, such as yoghourt, will keep for only about a week even in a refrigerator, unless they are treated with preservatives such as sorbic acid. If they are kept longer, the whey separates and bacteriological defects produce changes in taste, so that the sour milk products, more particularly drinks, have to be consumed immediately and are sold by the producer in a locally restricted area.

It is an object of the invention to produce sour milk drinks which will keep for a longer period.

Numerous experiments made on this problem have shown that the simple addition of gelatins or pectin, as already proposed in the manufacture of jellied yoghourt foods, is insufficient to keep sour milk drinks in a homogeneous condition for a long period.

Experiments on homogenising flavoured sour milk mixtures treated with pectin and sugar in an ordinary homogeniser at rising temperatures have led to the unexpected discovery that mixtures stablished at a temperature of 51 to 54.5° C. and pressures of approximately 350 to 380 atmospheres gauge were the only ones to remain completely homogenous for 6 weeks. If the temperature during homogenisation is less than 51° C., the resulting drink is rather more viscous and less palatable, with slight or considerable coagulation. Particles of deposited albumen appear on the inner surface of the glass bottle. The coagulation increases in proportion as the temperature during homogenisation is lower. After a few days, a whey deposit appears clearly on the surface, or whey cavities form inside the drink. The drink becomes temporarily uniform if shaken, but the whey separates out again.

If, on the other hand, homogenisation occurs at a temperature above 54.5° C., the drink remains thinly liquid without observable coagulation, but after a short time a cement-like deposit separates and is difficult to shape up, and the drink has a mealy or sandy taste. In these cases also, whey can separate out after a few days of storage.

These results must be due to reactions occurring in the sour milk solution during heating. As an illustration, 10 cc. of flavoured sour milk treated with pectin and sugar were heated completely uniformly in a Thiele apparatus serving as a water bath, the temperature of the solution being measured every 10 seconds with a thermometer calibrated in tenths of a degree. The measured results are given in the accompanying graph. The curve shows four marked temperature discontinuities at 45.3° C., 50–50.5° C., 52.5° C. and above 55° C. The discontinuities show that endothermic reactions occur at these temperatures. Two of the reactions occur at approximately 50–51° C. and 55° C. A series of experiments has shown that, to obtain sour milk drinks which will keep, the reaction occurring on heating to 50° C. must occur during homogenisation, but the reaction at 55° C. must not occur. The experiments show that the most stable sour milk drink is obtained if it is homogenised at 53° C., i.e. at the approximate place where the reaction at 52.5° C. occurs.

According to the present invention there is provided a method of manufacturing a flavoured sour milk drink comprising the steps of pasteurising and acidifying skimmed fresh milk, stirring into the milk an aqueous solution of citric acid and concentrated flavouring, subsequently stirring into the milk a mixture of pectin and sugar, homogenising the resulting mixture at a pressure in the range 350 to 380 atmospheres gauge after the temperature has been adjusted to a point in the range 51 to 54.5° C., and subsequently pouring the homogenised product into bottles and pasteurising the product for a period of from 20 to 30 minutes at an elevated temperature.

The sour milk drink produced in this manner will keep for several weeks at room temperature and is thus considerably more stable than known short-lived sour milk drinks, which become unpalatable after a week or so, even if kept in a refrigerator.

Preferably 3.5 to 8 g. of a highly esterified, quickly gelling pectin obtained from citrus fruits is added to each litre of the mixture of biologically acidified milk and fruit juice. The degree of esterification should if possible be between 70 and 75, the gell value should be 150° Sag and the Lüers value should be 250.

According to a further aspect of the invention there is provided apparatus for performing the above method including a first homogeniser, a second homogeniser and a heating device connected between the homogenisers and operating on the counter-current principle the first homogeniser being arranged to operate at a pressure of from 150 to 160 atmospheres gauge and at a temperature of from 12 to 16° C. and the heating device being arranged to puressurise sour milk mixture from the first homogeniser and to heat it to a temperature of from 51 to 54.5° C. and the second homogeniser being arranged to operate at said temperature of from 51 to 54.5° C. and at a pressure of from 350 to 380 atmospheres gauge.

The biologically soured milk can be replaced by milk which has been synthetically soured to an SH° of 33 to 50 by adding lactic acid and/or citric acid.

Various examples of methods of manufacturing flavoured sour milk drinks will now be described.

RASBERRY DRINK 10 litres of skimmed, fresh milk with a Soxhlet-Henkel degree of 6.5 to 7 were heated to 90° C. and then cooled to approximately 18° C. and treated with about 200 cc. of a pure culture of *Streptococcus cremoris* and *Streptococcus lactis* used in the preparation of sour-cream butter. The skimmed milk treated with pure culture was allowed to sour biologically for 22 hours, with occasional stirring to drive off the carbon dioxide. As soon as the Soxhlet-Henkel degree has risen to 34, acidification was considerably slowed down by cooling to approxiamtely 12° C.

A solution containing 100 g. of raspberry juice concentrated to 1/12 of its volume, 9 g. of citric acid containing water of crystallisation and 180 g. water was stirred in the resulting sour milk, which had been heated to 16° C. before further processing. The added solution has an acid number of 96.5 and a pH of 2.82.

A mixture of 60 g. of highly esterified pectin obtained from citrus fruits, 1,000 g. detrose and 300 g. beet sugar was thoroughly stirred in the milk culture treated with juice in solution, and the temperature fell to approximately 14.7° C. The pH of the mixture was now 4.01, the acid number was 6.27 and the Soxhlet-Henkel degree was 51.5. After the mixture has been left to stand for a short time, it was homogenised at the given temperature of approximately 15° C. in a homogeniser used for the treatment of milk, operating at a pressure of 150 to 160 atmospheres gauge. The mixture was then heated as nearly as possible to 53° C. and was then re-homogenised in another homogeniser at a pressure of 350 to 370 atmospheres gauge. The temperature on leaving the homogeniser should, if possible, not be above 57° C. The drink was then poured into bottles and pasteurised for 20 minutes at a temperature slowly increasing from 70 to 80° C. It has an excellent taste of raspberry buttermilk and was physically stable.

STRAWBERRY DRINK 10 litres of biologically soured milk (pH=4.50, $SH°=39.4$) were treated with a solution of the following composition:

100 g. of strawberry juice concentrated to approximately 1/12 of its volume, 25 g. citric acid containing water of crystallisation, and 163 g. of water. The solution had an acid number of 97.3 and a pH of 2.52.

The mixture of pectin and sugar given in Example 1 was then added.

The temperature of the pure culture was 15.6° C. After all the substances had been stirred in, the temperature fell to 14.0° C. The mixture has a pH of 3.98, and acid number of 6.38 and an SH° of 29.4.

The mixture was then homogenised at 150 to 160 atmospheres gauge, heated to a temperature of 53 to 53.5° C. and homogenised again at 350 to 370 atmospheres gauge.

The prepared drink was at 57° C. after hot homogenisation and was poured into bottles and pasteurised for 20 minutes at 70 to 80° C.

ORANGE DRINK 10 litres of biologically soured milk (pH=4.68, $SH°=35.1$) were treated with 300 g. of orange paste (concentarted to 1/8 of its volume, acid number 91.3) and then treated with a mixture containing 60 g. of highly-esterified pectin, 900 g. dextrose and 250 g. refined sugar in crystals. After about 15 minutes, the mixture was homogenised at 150 to 160 atmospheres gauge. It was then heated at 52.5 to 53.5° C. and homogenised while hot at 350 to 360 atmospheres gauge. The product left the installation at 56° C. was poured into bottles and was pasteurised for 20 minutes at a temperature slowly increasing from 70 to 80° C.

PINEAPPLE DRINK 10 litres of biologically soured milk (pH=4.5, $SH°=38.0$) were treated with a solutoin of 300 g. pineapple juice and citric acid (pH=2.11, acid number=100.1) and then treated with a mixture containing 60 g. of highly esterfied pectin, 1000 g. dextrose and 300 g. beet sugar.

The temperature of the mixture fell from 15.1 to 14.0° C. The pH was 3.89, the SH° was 51.0 and the acid number was 6.27.

After 10 to 15 minutes, the sour milk mixture was homogenised while cold at 150 to 160 atmospheres gauge and then heated in a counter-current apparatus until the temperature was 52.5 to 53° C. The subsequent hot homogenisation occurred at 350 to 370 atmospheres gauge, and the substance was poured into bottles at a temperature of 58.5° C. It was then pasteurised for about 20 minutes at temperatures increasing from 70 to 80° C.

The appearance of the drink was indistinguishable from fresh milk.

COLA DRINK 10 litres of biologically soured milk (pH=4.69, $SH°=35.6$) were treated with 300 g. cola base, free from phosphoric acid, which had previously been adjusted to an acid number of 11 with citric acid. Cola base is a mixture of cola with the flavouring substances, citric acid and water.

A mixture of 60 g. highly esterified pectin, 1,000 g. dextrose and 300 g. beet sugar was stirred into the flavoured sour milk, whereupon the temperature of the original pure culture fell from 17 to 16.2° C. The pH was 4.12, the SH° was 50.0, and the acid number was 6.10.

After standing for 15 minutes, the product was homogenised while cold at 16.8° C. and at a pressure of 150 to 160 atmospheres gauge, and was then heated to 54° C. in a countercurrent apparatus.

The subsequent hot homogenisation occurred at pressures between 350 to 380 atmospheres gauge. The drink left the plant at 60° C. After it had been poured into bottles, it was pasteurised for 20 minutes at temperatures increasing from 70 to 80° C.

An excellent, completely smooth and homogeneous product was obtained.

I claim:

1. A method of manufacturing a flavoured sour milk drink, said method comprising the steps of
    (a) pasteurising and acidifying skimmed fresh milk,
    (b) stirring into the milk an aqueous solution of citric acid and concentrated flavouring,
    (c) stirring into the milk a mixture of pectin and sugar,
    (d) adjusting the temperature of the mixture to a point in the range 51 to 54.5° C.
    (e) homogenising the mixture at a pressure in the range 350 to 380 atmospheres gauge, and
    (f) pouring the homogenised product into bottles and pasterurising the product for a period of from 20 to 30 minutes.

2. The method according to claim 1 wherein said homogenising step is carried out at a temperature of 53° C.

3. The method of claim 1 including the further steps performed after said pectin and sugar have been added and before the first mentioned said homogenising step, of first homogenising the mixture in a first homogeniser at a pressure in the range 150 to 160 atmospheres gauge and a temperature in the range 12 to 16° C. and subsequently compressing the mixture to said pressure in the range 350 to 380 atmospheres gauge and heating it to said temperature in the range 51 to 54.5° C.

4. The method of claim 1 in which the milk after the first mentioned said pasteurising step is first soured to a pH value of 4.5 to 4.7 and a Soxhlet-Henkel degree (SH°) of 33 to 40, the amount of said citric acid subsequently added being such that the mixture, after said addition of pectin and sugar and before homogenisation has a pH value of from 3.8 to 4.2, an acid number of from 6.0 to 6.5 and a Soxhlet-Henkel degree of from 48.0 to 52.0.

5. The method of claim 4 wherein approximately 30 g. of an aqueous fruit juice solution acidified with at least 3 g. of citric acid containing water of crystallisation and having an acid number 80 to 105 is added to each litre of soured milk.

6. The method of claim 1 wherein 3.5 to 8 g. of highly esterified readily gelling pectin is added to each litre of the mixture of soured milk and flavouring.

References Cited

UNITED STATES PATENTS 3,539,363  11/1970  Morgan et al. _____ 99—59 X

FOREIGN PATENTS 102,918  11/1953  Netherlands _____ 99—59

A. LOUIS MONACELL, Primary Examiner

D. M. NAFF, Assistant Examiner

U.S. Cl. X.R.

99—54

UNITED STATES PATENT OFFICE
CERTIFICATE OF CORRECTION

Patent No. 3625702          Dated December 7, 1971

Inventor(s) HEINRICH EXLER

It is certified that error appears in the above-identified patent and that said Letters Patent are hereby corrected as shown below:

In the heading of the patent, Heinrich Exler's address is:

Heidbrede 81
    4807 Borgholzhausen (Germany)

Signed and sealed this 27th day of June 1972.

(SEAL)
Attest:

EDWARD M. FLETCHER, JR.      ROBERT GOTTSCHALK
Attesting Officer            Commissioner of Patents